United States Patent
Burgess et al.

(10) Patent No.: US 11,193,315 B2
(45) Date of Patent: Dec. 7, 2021

(54) FRICTION BRAKE

(71) Applicant: SAINT-GOBAIN PERFORMANCE PLASTICS RENCOL LIMITED, Coventry (GB)

(72) Inventors: James K. Burgess, Bristol (GB); Paul Haines, Bristol (GB)

(73) Assignee: SAINT-GOBAIN PERFORMANCE PLASTICS RENCOL LIMITED, Coventry (GB)

(*) Notice: Subject to any disclaimer, the term of this patent is extended or adjusted under 35 U.S.C. 154(b) by 820 days.

(21) Appl. No.: 15/795,360

(22) Filed: Oct. 27, 2017

(65) Prior Publication Data

US 2018/0128026 A1 May 10, 2018

Related U.S. Application Data

(60) Provisional application No. 62/416,000, filed on Nov. 1, 2016.

(51) Int. Cl.
| | |
|---|---|
| *B60R 25/0215* | (2013.01) |
| *E05C 17/22* | (2006.01) |
| *F16D 63/00* | (2006.01) |
| *E05C 17/20* | (2006.01) |

(52) U.S. Cl.
CPC ............ *E05C 17/22* (2013.01); *E05C 17/203* (2013.01); *F16D 63/00* (2013.01); *E05Y 2201/21* (2013.01); *E05Y 2201/26* (2013.01); *E05Y 2900/531* (2013.01)

(58) Field of Classification Search
CPC .......... E05F 5/025; E05F 3/102; E05C 17/22; E05C 17/203; B60R 25/0215

USPC .................. 16/82, 337, 341; 188/67, 69
See application file for complete search history.

(56) References Cited

U.S. PATENT DOCUMENTS

| | | | |
|---|---|---|---|
| 3,038,195 A * | 6/1962 | Bardfeld | E05F 3/16 |
| | | | 16/49 |
| 3,757,472 A | 9/1973 | Rogakos | |
| 5,161,649 A * | 11/1992 | Carraro | F16D 65/54 |
| | | | 188/196 P |
| 5,346,272 A | 9/1994 | Priest et al. | |
| 5,400,695 A * | 3/1995 | Walker | F15B 15/1447 |
| | | | 92/128 |
| 6,349,448 B1 | 2/2002 | Breed et al. | |
| 6,513,193 B1 | 2/2003 | Yezersky et al. | |
| 7,240,399 B2 | 7/2007 | Murayama et al. | |

(Continued)

FOREIGN PATENT DOCUMENTS

| | | |
|---|---|---|
| EP | 0897044 A2 | 2/1999 |
| JP | 2006132230 A | 5/2006 |

(Continued)

OTHER PUBLICATIONS

International Search Report and Written Opinion for PCT/EP2017/077576, dated Feb. 16, 2018, 13 pages.

*Primary Examiner* — Christopher P Schwartz
(74) *Attorney, Agent, or Firm* — Abel Schillinger, LLP; Chi Suk Kim

(57) ABSTRACT

A friction brake including a shaft having an input end and an output end, at least one lock collar, at least one tolerance ring disposed between the lock collar and the shaft providing an interference fit therebetween, and a locking component adapted to engage the lock collar to prevent rotation of the lock collar.

18 Claims, 6 Drawing Sheets

(56) References Cited

U.S. PATENT DOCUMENTS

| | | | |
|---|---|---|---|
| 8,506,002 B2 | 8/2013 | Sonnek et al. | |
| 9,022,683 B2 * | 5/2015 | Nias | F16D 1/0835 |
| | | | 403/273 |
| 9,074,637 B2 * | 7/2015 | Slayne | F16D 1/0835 |
| 10,094,426 B2 * | 10/2018 | Slayne | F16D 1/0835 |
| 2005/0167991 A1 | 8/2005 | Yoneyama et al. | |
| 2006/0230574 A1 | 10/2006 | Murayama et al. | |
| 2007/0096572 A1 * | 5/2007 | Watkins | H02K 5/1732 |
| | | | 310/90 |
| 2008/0184525 A1 | 8/2008 | Cruz et al. | |
| 2008/0309120 A1 * | 12/2008 | Kohlstrand | E05C 17/003 |
| | | | 296/146.11 |
| 2009/0229325 A1 * | 9/2009 | Cymbal | B60R 25/0211 |
| | | | 70/189 |
| 2010/0307872 A1 * | 12/2010 | Wheeler | E05C 17/30 |
| | | | 188/67 |
| 2013/0324345 A1 | 12/2013 | Asakura et al. | |
| 2014/0096342 A1 | 4/2014 | Kim | |
| 2015/0233165 A1 | 8/2015 | Kwak | |
| 2015/0292251 A1 | 10/2015 | Prieur | |
| 2016/0009311 A1 * | 1/2016 | Khale | B62D 15/025 |
| | | | 74/530 |
| 2016/0010379 A1 | 1/2016 | Sauerwein et al. | |

FOREIGN PATENT DOCUMENTS

| | | |
|---|---|---|
| JP | 2014091375 A | 5/2014 |
| JP | 2014201287 A | 10/2014 |
| WO | 2000031367 A1 | 6/2000 |

* cited by examiner

FRICTION BRAKE

CROSS-REFERENCE TO RELATED APPLICATION(S)

This application claims priority under 35 U.S.C. § 119(e) to U.S. Patent Application No. 62/416,000 entitled "FRICTION BRAKE," by James K. Burgess et al., filed Nov. 1, 2016, which is assigned to the current assignee hereof and incorporated herein by reference in its entirety.

FIELD OF THE DISCLOSURE

This disclosure relates to an apparatus comprising a friction brake, and more particularly, a friction brake that includes a bearing or torque assembly.

BACKGROUND

A friction brake can be used to prevent, stop, or retard the movement of a movable body. A friction brake can include or be a part of a door check mechanism which can be used to start, prevent or stop movement of a door or other movable body on a vehicle. A door check mechanism can be used to bias or retain a door or vehicle body in a certain position.

Problems can occur in friction brakes due to overload situations, larger size and complexity of assembly, varying torque over a lifetime due to wear or abrasion of the components of the assembly, or performance of the friction brake components being dependent on temperature or other conditions. These all can increase cost of components, operation, and assembly of the friction brake.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
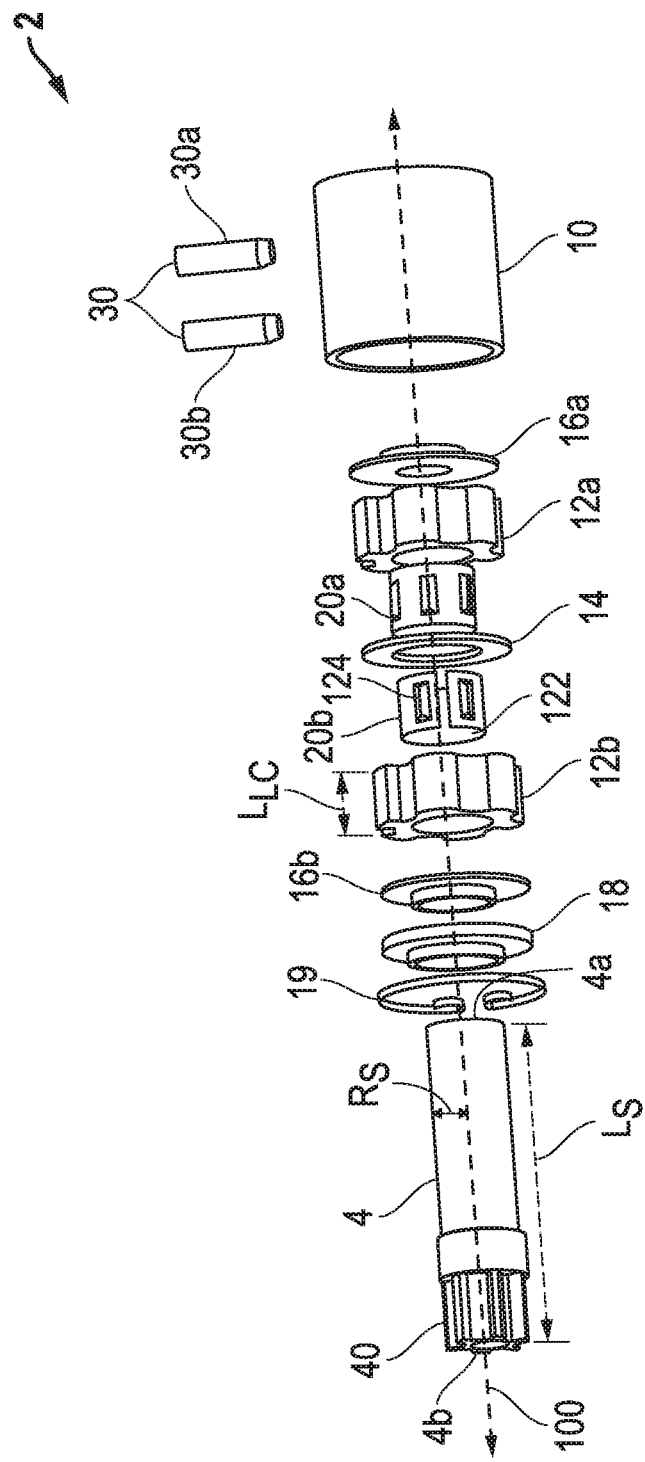
FIG. 1 is an exploded perspective view of a friction brake according to at least one embodiment of the invention.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item. Also, the use of "about" or "substantially" is employed to convey spatial or numerical relationships that describe any value or relationship that does not depart from the scope of the invention.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the friction brake and bearing arts.

A friction brake in accordance with one or more embodiments described herein can include a shaft having an input end and an output end; at least one lock collar; at least one tolerance ring disposed between the lock collar and the shaft providing an interference fit therebetween; and a locking component adapted to engage the lock collar to prevent rotation of the lock collar. A vehicle door panel assembly in accordance with one or more embodiments described herein can include a friction brake including a shaft having an input end and an output end; at least one lock collar; at least one tolerance ring disposed between the lock collar and the shaft providing an interference fit therebetween; and a locking component adapted to engage the lock collar to prevent rotation of the lock collar, wherein the shaft output end may be operatively connected to a door panel. A method in accordance with one or more embodiments described herein can include providing a friction brake including: a shaft having an input end and an output end; at least one lock collar; at least one tolerance ring disposed between the lock collar and the shaft providing an interference fit therebetween; and a locking component adapted to engage the lock collar to prevent rotation of the lock collar; and engaging the locking component to prevent rotation of the lock collar.

The friction brake, vehicle door panel assembly, or method of any one of the preceding embodiments, can be further defined as wherein the tolerance ring may be adapted to provide rotation of the shaft when the lock collar may be prevented from rotating. The friction brake, vehicle door panel assembly, or method of any one of the preceding embodiments, can be further defined as wherein the locking mechanism comprises a locking pin assembly comprising locking pins. The friction brake, vehicle door panel assembly, or method of any one of the preceding embodiments, can be further defined as wherein the locking component engages the lock collar based on an actuation signal provided by magnetic, electric, or electromagnetic means. The friction brake, vehicle door panel assembly, or method of any one of the preceding embodiments, can be further defined as wherein the at least one tolerance ring has a diameter of no greater than 3.5 mm, no greater than about 5 mm, of no greater than about 10 mm, of no greater than about 15 mm, of no greater than about 20 mm. The friction brake, vehicle door panel assembly, or method of any one of the preceding embodiments, can be further defined as wherein the at least one tolerance ring has a length of no greater than about 5 mm, of no greater than about 10 mm, of no greater than about 15 mm, of no greater than about 20 mm. The friction brake, vehicle door panel assembly, or method of any one of the preceding embodiments, can be further defined as wherein the at least one tolerance ring has a holding torque of about $1 \leq X \leq$ about 7 N·m. The friction brake, vehicle door panel assembly, or method of any one of the preceding embodiments, can be further defined as wherein the at least one tolerance ring comprises an annular band and a plurality of projections around the circumference of the annular band. The friction brake, vehicle door panel assembly, or method of any one of the preceding embodiments, can be further defined as wherein the shaft input end may be operatively connected to a motor. The friction brake, vehicle door panel assembly, or method of any one of the preceding embodiments, can be further defined as wherein the friction brake further comprises at least one washer. The friction brake, vehicle door panel assembly, or method of any one of the preceding embodiments, can be further defined as wherein the fixing assembly further comprises a bearing. The friction brake, vehicle door panel assembly, or method of any one of the preceding embodiments, can be further defined as wherein the fixing assembly further comprises a housing at least partially surrounding the lock collar. The friction brake, vehicle door panel assembly, or method of any one of the preceding embodiments, can be further defined as wherein the fixing assembly further comprises a circlip. The friction brake, vehicle door panel assembly, or method of any one of the preceding embodiments, can be further defined as wherein the locking component further comprises a locking pin assembly. The friction brake, vehicle door panel assembly, or method of any one of the preceding embodiments, can be further defined as wherein the friction brake further comprises a solenoid adapted to provide an actuation signal to the locking component. The friction brake, vehicle door panel assembly, or method of any one of the preceding embodiments, can be further defined as wherein the at least one tolerance ring comprises a first tolerance ring and a second tolerance ring. The friction brake, vehicle door panel assembly, or method of any one of the preceding embodiments, can be further defined as wherein the first tolerance ring has a holding torque of about 1 N·m to about 3 N·m and the second tolerance ring has a holding torque of about 5 N·m to about 20 N·m and wherein the first tolerance ring and the second tolerance ring have different holding torques. The friction brake or method of any one of the preceding embodiments, can be further defined as wherein shaft output end may be operatively connected to a checker arm.

Figure 2:
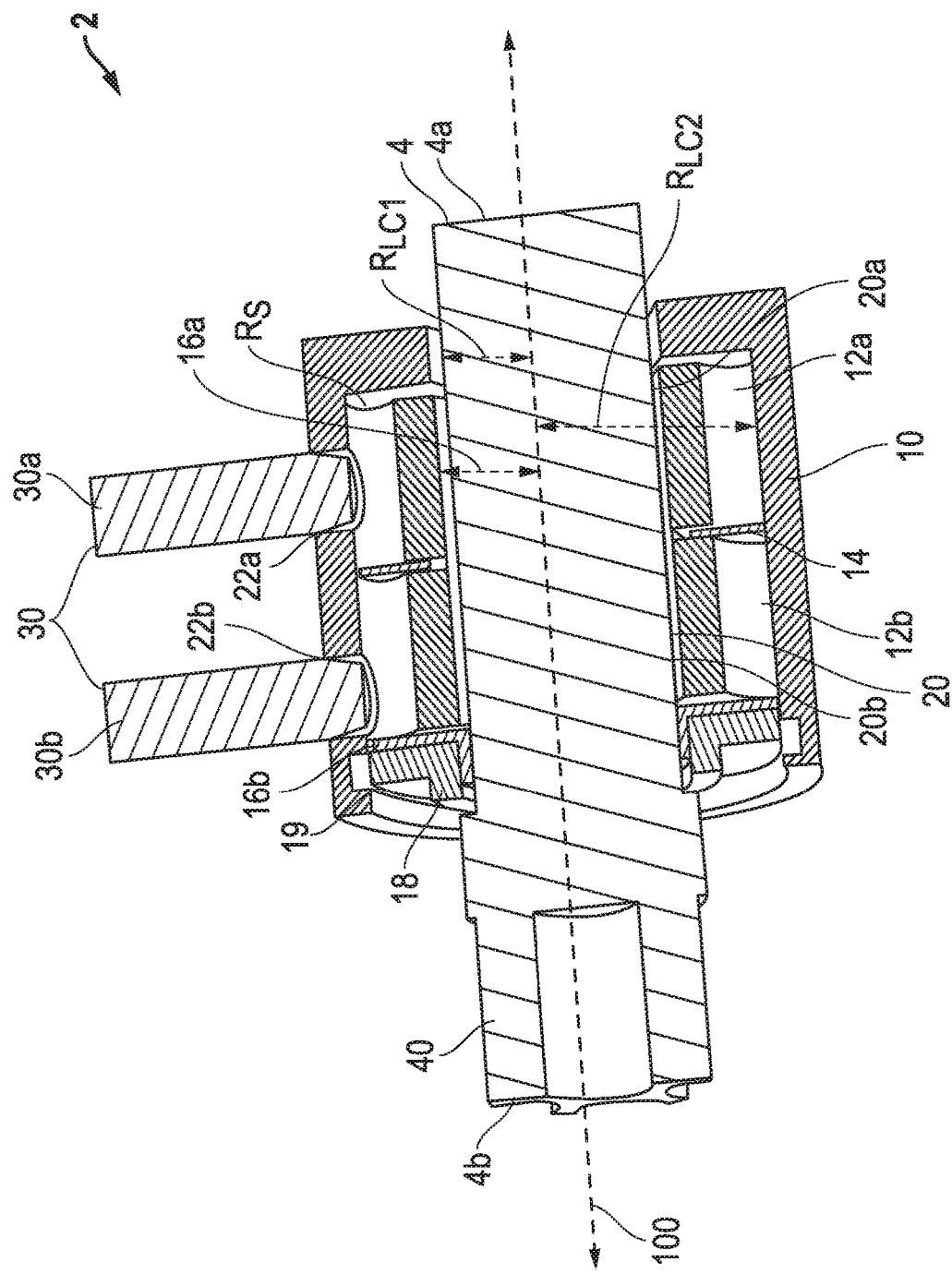
FIG. 2 is a cross-sectional view of a friction brake according to at least one embodiment of the invention.

Referring initially to FIGS. 1-2, a friction brake 2 generally includes shaft 4 having an input 4a and an output end 4b directed along a central axis 100 that orients axially down the cross-section of the friction brake 2. In at least one embodiment, the output end of the shaft 4b may include a gearset 40. In at least one embodiment, the friction brake 2 can include a housing 10. In at least one embodiment, the shaft 4 may be at least surrounded by a housing 10. In at least one embodiment, the friction brake 2 can include at least one lock collar 12. In at least one embodiment, the lock collar 12 can comprise a first piece 12a and a second piece 12b. In at least one embodiment, the friction brake 2 can include a washer 14. In at least one embodiment, the friction brake 2 can include at least one bearing 16. In at least one embodiment, the bearing 16 can comprise a first bearing piece 16a and a second bearing piece 16b. In at least one embodiment, the friction brake 2 can include an end plate 18. In at least one embodiment, the friction brake 2 can include a circlip 19. In at least one embodiment, the friction brake 2 can include at least one tolerance ring 20. In at least one embodiment, the friction brake 2 can include a first tolerance ring 20A and a second tolerance ring 20B. In at least one embodiment, the at least one tolerance ring 20 may be radially disposed between the lock collar 12 and the shaft 4 and provide an interference fit therebetween.

In at least one embodiment, the friction brake may include at least one locking component 30. In at least one embodiment, the locking component 30 may include a first locking component 30a and a second locking component 30b. In at least one embodiment, the first locking component 30a may operatively engage the first lock collar piece 12a to prevent or retard the shaft 4 from rotating. In at least one embodiment, the second locking component 30b may operatively engage the second lock collar piece 12b to prevent or retard the shaft 4 from rotating. In at least one embodiment, the locking component 30 may operatively engage the lock collar 12 through at least one bore 22 in the housing. In at least one embodiment, the at least one bore 22 may include a first bore 22a and a second bore 22b to accommodate the first locking component 30a and the second locking component 30b respectively. In at least one embodiment, at least one of the locking component 30, the first locking component 30a and the second locking component 30b may include a pin, groove and stop, nut and bolt, nut and screw, latch, handle, locking nut, tie rivet, or may be locked another way.

In at least one embodiment, as shown in FIGS. 1-3B, the friction brake 2 may further include at least one tolerance ring 20. In at least one embodiment, the tolerance ring 20 may be provided between the lock collar 12 and the shaft 4. In at least one embodiment, the tolerance ring 20 may be adapted to adjust torque by modifying the axial or radial spacing between the lock collar 12 and the shaft 4 to stop or retard rotation of the shaft 4. In at least one embodiment, the tolerance ring 20 can be frictionally coupled to at least one of the lock collar 12 and the shaft 4. That is, engagement between the tolerance ring 20 and one of the lock collar 12 and the shaft 4 can occur through frictional resistance. In at least one embodiment, the tolerance ring 20 can be provided to fit the lock collar 12 and the shaft 4 together and compensate for variations in the manufacturing process of those components which cause variations in their dimensions.

Figure 3A:
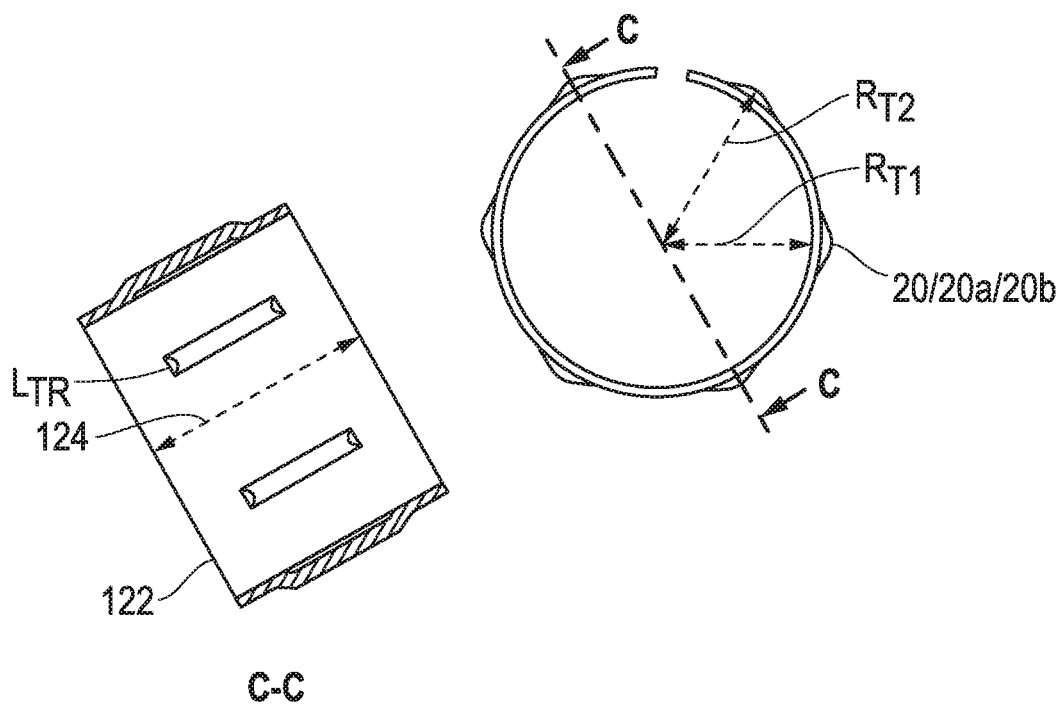
FIG. 3A is a side view and a cross-sectional view of a tolerance ring of a torque assembly according to at least one embodiment of the invention.
Figure 3B:
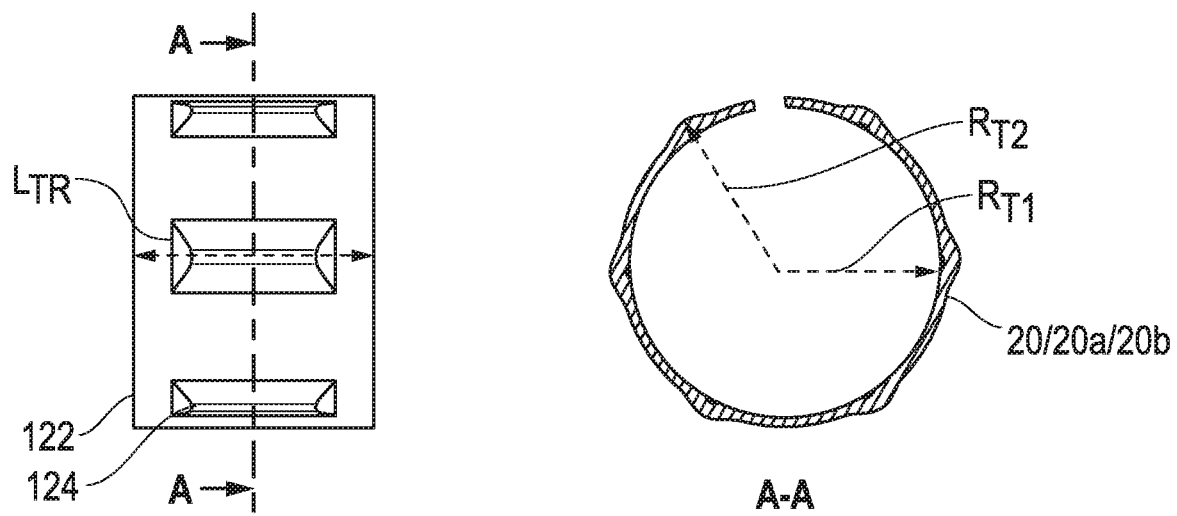
FIG. 3B is a side view and a cross-sectional view of a tolerance ring of a torque assembly according to at least one embodiment of the invention.

As shown in FIGS. 3A-3B, the tolerance ring 20 can comprise at least one annular band 122. In at least one embodiment, the annular band 122 may include projections (or "waves structures") 124 that extend radially therefrom. In a number of embodiments, the projections 124 can be formed into a flat strip, which may be subsequently formed into the curved annular band 22. In at least one embodiment, the projections 124 can be deformable or adapted to deform in the radial direction via compression when placed between the lock collar 12 and the shaft 4. In at least one embodiment, at least some of the projections 24 can extend in the same direction, which in this embodiment may be radially outwardly from the band 22. In at least one embodiment, the projections 24 may form apexes 26 sloped radially outward from the annular band 22. In at least one embodiment, as shown in FIG. 3a, the tolerance ring 20/20a/20b may have a cross sectional line C-C. In at least one embodiment, as shown in FIG. 3b, the tolerance ring 20/20a/20b may have a cross sectional line A-A. The present disclosure is not intended to be limited to those embodiments illustrated in FIGS. 3A-3B. In a non-illustrated embodiment, the projections have staggered heights relative to one another. In a more particular embodiment, alternating projections can have alternating radial heights $R_{TH}$. In another more particular embodiment, at least three of the projections can have a first radial height and the remaining projections can have a second radial height different than the first radial height. In at least one embodiment, the tolerance ring 20 be made of a material conventional in the art such as, but not limited to, a metal or metal alloy, a polymer, a ceramic, or a composite material.

In at least one embodiment, the tolerance ring 20, first tolerance ring 20a or second tolerance ring 20b may have an inner radius $R_{T1}$ of at least 3.5 mm, at least 5 mm, at least 10 mm, at least 15 mm, at least 20 mm, at least 30 mm, at least 40 mm. In at least one embodiment, the inner radius $R_{T1}$ may be no greater than 5 mm, no greater than 10 mm, no greater than 15 mm, no greater than 20 mm, no greater than 30 mm, no greater than 40 mm. In at least one embodiment, the tolerance ring 20, first tolerance ring 20a or second tolerance ring 20b may have an outer radius $R_{T2}$ of at least 3.5 mm, at least 5 mm, at least 10 mm, at least 15 mm, at least 20 mm, at least 30 mm, at least 40 mm. In at least one embodiment, the outer radius $R_{T2}$ may be no greater than 5 mm, no greater than 10 mm, no greater than 15 mm, no greater than 20 mm, no greater than 30 mm, no greater than 40 mm. In at least one embodiment, the tolerance ring 20, first tolerance ring 20a or second tolerance ring 20b may have a projection radius $R_{TH}$ of at least 3.5 mm, at least 5 mm, at least 10 mm, at least 15 mm, at least 20 mm, at least 30 mm, at least 40 mm. In at least one embodiment, the a projection radius $R_{TH}$ may be no greater than 5 mm, no greater than 10 mm, no greater than 15 mm, no greater than 20 mm, no greater than 30 mm, no greater than 40 mm. In at least one embodiment, the tolerance ring 20 may be sloped in the axial direction along an exterior surface 25 of the tolerance ring 20. In at least one embodiment, the tolerance ring 20, first tolerance ring 20a or second tolerance ring 20b can have an axial length, $L_{TR}$, as measured between axial ends 21 and 23, of no greater than 5 mm, no greater than 10 mm, no greater than 15 mm, no greater than 20 mm, no greater than 30 mm, no greater than 40 mm. In at least one embodiment, the tolerance ring 20, first tolerance ring 20a or second tolerance ring 20b can have an axial length, $L_{TR}$, as measured between axial ends 21 and 23, of at least 5 mm, at least 10 mm, at least 15 mm, at least 20 mm, at least 30 mm, at least 40 mm. In at least one embodiment, the first tolerance ring 20a and the second tolerance ring 20b can have different inner radii $R_{T1}$, outer radii $R_{T2}$, projection radii $R_{TH}$ or axial lengths $L_{TR}$. In at least one embodiment, the tolerance ring 20 may be sloped in the axial direction along an exterior surface 25 of the tolerance ring 20.

In an embodiment, the tolerance ring 20 can be monolithically formed from a single piece of material. The projections 24 can be stamped or otherwise formed in the piece of material. The tolerance ring 20 can then be rolled to a cylindrical, or generally cylindrical, shape, with the projections 24 extending radially inward or radially outward as desired. By way of a non-limiting example, the tolerance ring 20 can include at least 3 projections 24 extending radially from the annular 22, such as at least 4 projections, at least 5 projections, at least 6 projections, at least 7 projections, at least 8 projections, at least 9 projections, or even at least 10 projections. The projections 24 can be evenly spaced apart in a circumferential direction around the tolerance ring 20. In a non-illustrated embodiment, each projection can include a plurality of projections extending in an axial direction. That is, each projection can include a plurality of smaller projections at least partially occupying a similar footprint as the previously described projection. In at least one embodiment, the tolerance ring 20 can be formed as a split ring, i.e., the tolerance ring 20 includes an axially extending gap. In at least one embodiment, the tolerance ring 20 may include two tolerance rings 20a and 20b. In at least one embodiment, the first tolerance ring 20a may have a holding torque that may be the same or different than the holding torque of the second tolerance ring 20b. In a number of embodiments, the first tolerance ring 20a may be disposed between the first lock collar 12a and the shaft 4. In a number of embodiments, the second tolerance ring 20B may be disposed between the second lock collar 12b and the shaft 4. In at least one embodiment, the first tolerance ring 20a may have a holding torque in the range of about 1 N·m to about 7 N·m. In at least one embodiment, the second tolerance ring 20b may have a holding torque in the range of about 1 N·m to about 20 N·m. In at least one embodiment, the first tolerance ring 20A may have a holding torque of about 3 N·m. In at least one embodiment, the second tolerance ring 20b may have a holding torque of about 5 N·m. In at least one embodiment, the second tolerance ring 20b may have a different holding torque than the first tolerance ring 20a.

FIG. 2 includes a cross section view of the friction brake 2 in the installed state, i.e., after installation of the tolerance rings 20a, b between the lock collars 12a, 12b and the shaft 4. In at least one embodiment, the projections 24 may be compressed between the lock collars 12A, 12B and the shaft 4 as viewed in the installed state. In an embodiment, each of the projections 24 can have a radial stiffness of less than 5000 N/mm, such as less than 4000 N/mm, such as less than 3000 N/m, such as less than 2000 N/m. In an embodiment, each of the projections 24 can have a radial stiffness of less than 1000 N/mm, such as less than 750 N/mm, less than 500 N/mm, less than 250 N/mm, less than 200 N/mm, less than 150 N/mm, less than 100 N/mm, less than 50 N/mm, less than 25 N/mm, less than 10 N/mm, less than 5 N/mm, less than 4 N/mm, less than 3 N/mm, less than 2 N/mm, or even less than 1 N/mm. The radial stiffness can be greater than 0 N/mm.

In at least one embodiment, the radius of the shaft 4 $R_S$ may be at least 5 mm, at least 10 mm, at least 15 mm, at least 20 mm, at least 30 mm, at least 40 mm. In at least one embodiment, the radius of the shaft 4 $R_S$ may be no greater than 5 mm, no greater than 10 mm, no greater than 15 mm, no greater than 20 mm, no greater than 30 mm, no greater than 40 mm. In at least one embodiment, the inner radius of the lock collar 12, first lock collar 12a, or second lock collar 12b $R_{LC}$ may be at least 5 mm, at least 10 mm, at least 15 mm, at least 20 mm, at least 30 mm, at least 40 mm. In at least one embodiment, the radius of the shaft 4 $R_S$ may be no greater than 5 mm, no greater than 10 mm, no greater than 15 mm, no greater than 20 mm, no greater than 30 mm, no greater than 40 mm. In an embodiment, the shaft 4 can have an axial length, $L_S$, as measured between axial ends 21 and 23, of no greater than 5 mm, no greater than 10 mm, no greater than 15 mm, no greater than 20 mm, no greater than 30 mm, no greater than 40 mm. In at least one embodiment, the shaft 4 can have an axial length, $L_S$, as measured between axial ends 21 and 23, of at least 5 mm, at least 10 mm, at least 15 mm, at least 20 mm, at least 30 mm, at least 40 mm. In at least one embodiment, shaft 4 may be made of a material conventional in the art such as, but not limited to, a metal or metal alloy, a polymer, a ceramic, or a composite material.

In at least one embodiment, the lock collar 12, first lock collar 12a or second lock collar 12b may have an inner radius $R_{LC1}$ of at least 5 mm, at least 10 mm, at least 15 mm, at least 20 mm, at least 30 mm, at least 40 mm. In at least one embodiment, the inner radius $R_{LC1}$ may be no greater than 5 mm, no greater than 10 mm, no greater than 15 mm, no greater than 20 mm, no greater than 30 mm, no greater than 40 mm. In at least one embodiment, the lock collar 12, first lock collar 12a or second lock collar 12b may have an outer radius $R_{LC2}$ of at least 5 mm, at least 10 mm, at least 15 mm, at least 20 mm, at least 30 mm, at least 40 mm. In at least one embodiment, the outer radius $R_{LC2}$ may be no greater than 5 mm, no greater than 10 mm, no greater than 15 mm, no greater than 20 mm, no greater than 30 mm, no greater than 40 mm. In an embodiment, the lock collar 12, first lock collar 12a or second lock collar 12b can have an axial length, $L_{LC}$, as measured between axial ends 21 and 23, of no greater than 5 mm, no greater than 10 mm, no greater than 15 mm, no greater than 20 mm, no greater than 30 mm, no greater than 40 mm. In at least one embodiment, the lock collar 12, first lock collar 12a or second lock collar 12b can have an axial length, $L_{LC}$, as measured between axial ends 21 and 23, of at least 5 mm, at least 10 mm, at least 15 mm, at least 20 mm, at least 30 mm, at least 40 mm. In at least one embodiment, the length and radius of the lock collar 12, first lock collar 12a or second lock collar 12b can be sized to fit around the shaft to provide an interference fit between the tolerance ring 20, first tolerance ring 20a or second tolerance ring 20b and the shaft 4. In at least one embodiment, the first lock collar 12a and the second lock collar 12b can have different inner radii $R_{LC1}$, outer radii $R_{LC2}$, or axial lengths $L_{LC}$. In at least one embodiment, the lock collar 12, first lock collar 12a or second lock collar 12b may be made of a material conventional in the art such as, but not limited to, a metal or metal alloy, a polymer, a ceramic, or a composite material.

In at least one embodiment, the length and radius of the housing 10 can be sized to fit around the shaft to provide an interference fit between the tolerance ring 20, first tolerance ring 20a or second tolerance ring 20b and the shaft 4. In at least one embodiment, the housing 10 may be made of a material conventional in the art such as, but not limited to, a metal or metal alloy, a polymer, a ceramic, or a composite material. In at least one embodiment, the length and radius of the washer 14 can be sized to fit around the shaft to provide an interference fit between the tolerance ring 20, first tolerance ring 20a or second tolerance ring 20b and the shaft 4. In at least one embodiment, the washer 14 may be made of a material conventional in the art such as, but not limited to, a metal or metal alloy, a polymer, a ceramic, or a composite material. In at least one embodiment, the length and radius of the bearing 16, first bearing 16a, or second bearing 16b can be sized to fit around the shaft to provide an interference fit between the tolerance ring 20, first tolerance ring 20a or second tolerance ring 20b and the shaft 4. In at least one embodiment, the bearing 16, first bearing 16a, or second bearing 16b may be made of a material conventional in the art such as, but not limited to, a metal or metal alloy, a polymer, a ceramic, or a composite material. In at least one embodiment, the length and radius of end plate 18 can be sized to fit around the shaft to provide an interference fit between the tolerance ring 20, first tolerance ring 20a or second tolerance ring 20b and the shaft 4. In at least one embodiment, the end plate 18 may be made of a material conventional in the art such as, but not limited to, a metal or metal alloy, a polymer, a ceramic, or a composite material. In at least one embodiment, the length and radius of circlip 19 can be sized to fit around the shaft to provide an interference fit between the tolerance ring 20, first tolerance ring 20a or second tolerance ring 20b and the shaft 4. In at least one embodiment, the circlip 19 may be made of a material conventional in the art such as, but not limited to, a metal or metal alloy, a polymer, a ceramic, or a composite material. In at least one embodiment, the length and radius of locking component 30, first locking component 30a, or second locking component 30b can be sized to fit around the shaft to provide an interference fit between the tolerance ring 20, first tolerance ring 20a or second tolerance ring 20b and the shaft 4. In at least one embodiment, first locking component 30a, or second locking component 30b may be made of a material conventional in the art such as, but not limited to, a metal or metal alloy, a polymer, a ceramic, or a composite material.

Figure 4A:
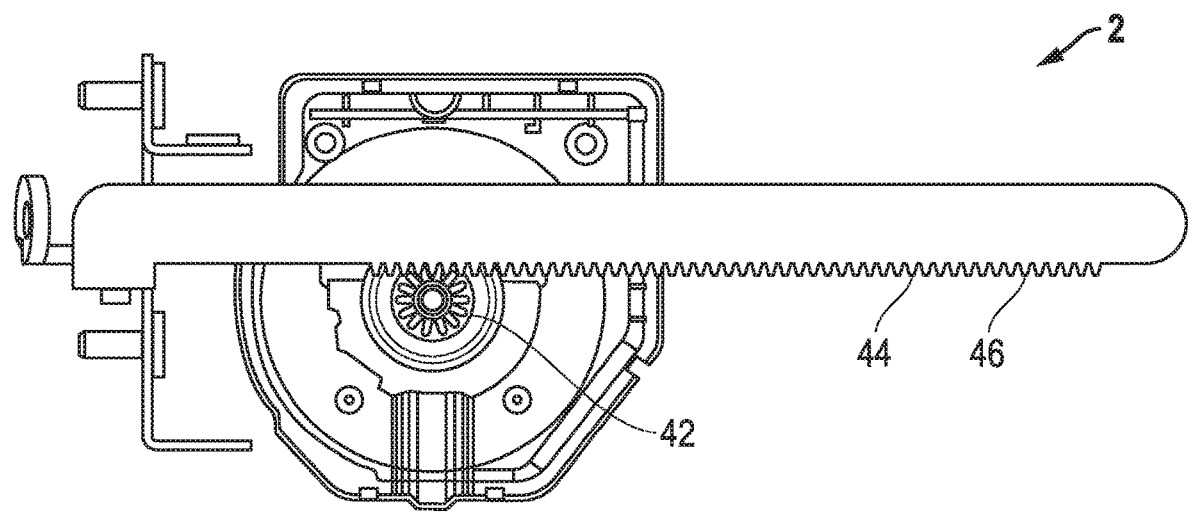
FIG. 4A is an exploded perspective view of a friction brake according to at least one embodiment of the invention.
Figure 4B:
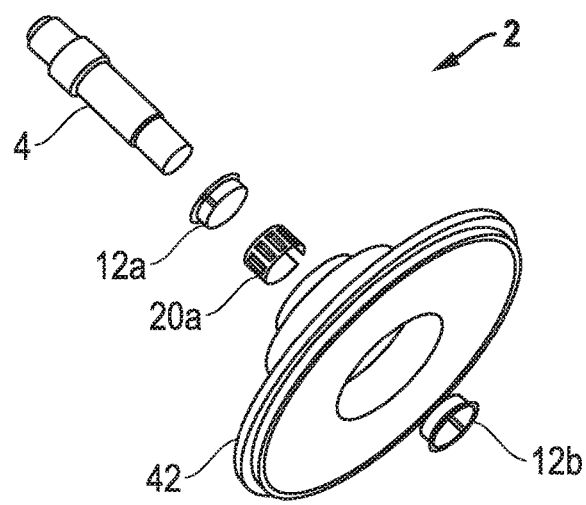
FIG. 4B is a front view of a friction brake according to at least one embodiment of the invention.

In at least one embodiment, the shaft 4 may connect to or be a part of a gearset 40 at a shaft output end 4b. In at least one embodiment, the gearset 40 may include the friction brake 2. In at least one embodiment, the gearset 40 may be included as a part of a friction brake 2. In at least one embodiment, as shown in FIGS. 4A-4B, the friction brake 2 or gearset 40 can include a pinion gear 42. In at least one embodiment, the shaft output end 4b or gearset 40 may be operatively connected to the pinion gear 42. In at least one embodiment, the pinion gear 42 can be operatively connected to a checker arm or rack 44. In at least one embodiment, the checker arm or rack 44 may have an engagement means 46 for engaging the gearset 40 or pinion gear 42. In at least one embodiment, the engagement means 46 may include a threading or teeth to operatively connect to the gearset 40 or pinion gear 42 or may be another type of engagement means. In at least one embodiment, the checker arm or rack 44 may be connected to or operatively engaged with a movable body (not illustrated). In at least one embodiment, the movable body may be opened, closed, or stopped at a set location based on the movement of the checker arm or rack 44 as moved by the friction brake 2. In at least one embodiment, the shaft output end 4b may be operatively connected to the movable body. In at least one embodiment, the movable body may be a panel including, but not limited to, a vehicle door, tailgate, or other movable vehicle exterior component. In at least one embodiment, the movable body may be a panel including, but not limited to, a vehicle seat, armrest, or other movable vehicle interior component. In at least one embodiment, the friction brake 2 may be a part of or incorporated as a vehicle door panel assembly. In at least one embodiment, the shaft output end 4b may be operatively connected to a door panel.

Figure 5A:
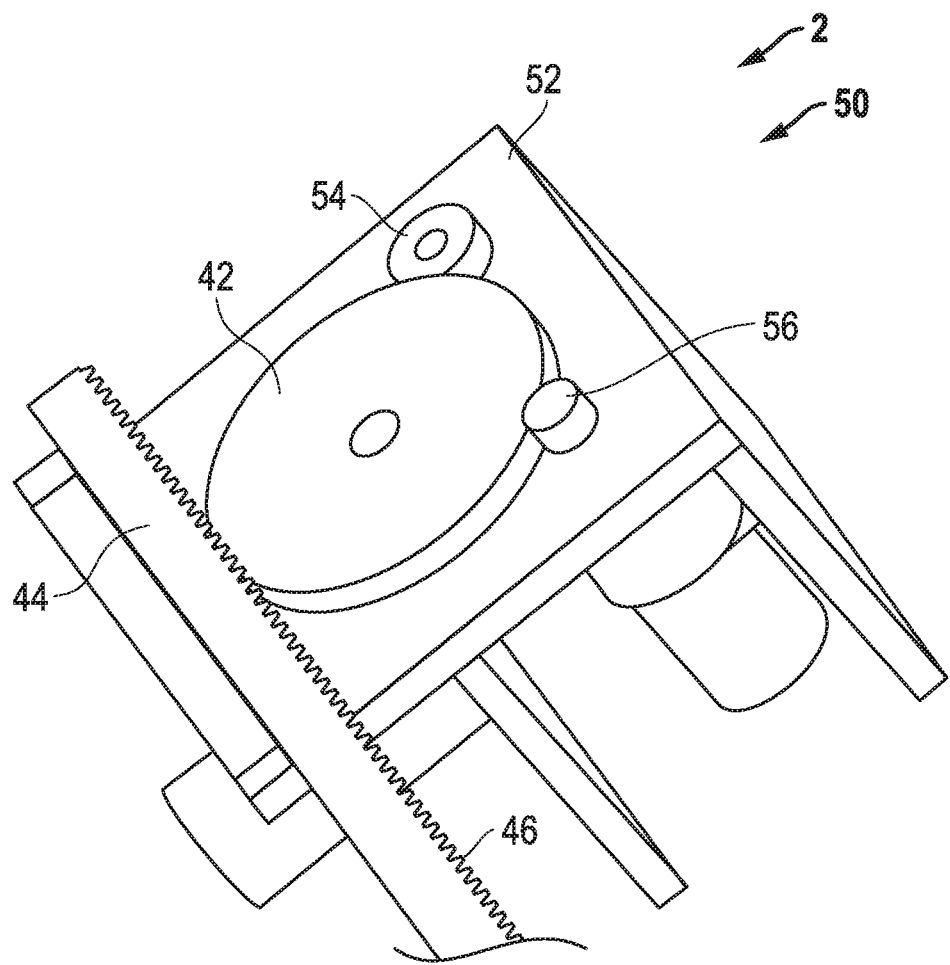
FIG. 5A is a perspective view of a friction brake and/or gearbox according to at least one embodiment of the invention.
Figure 5B:
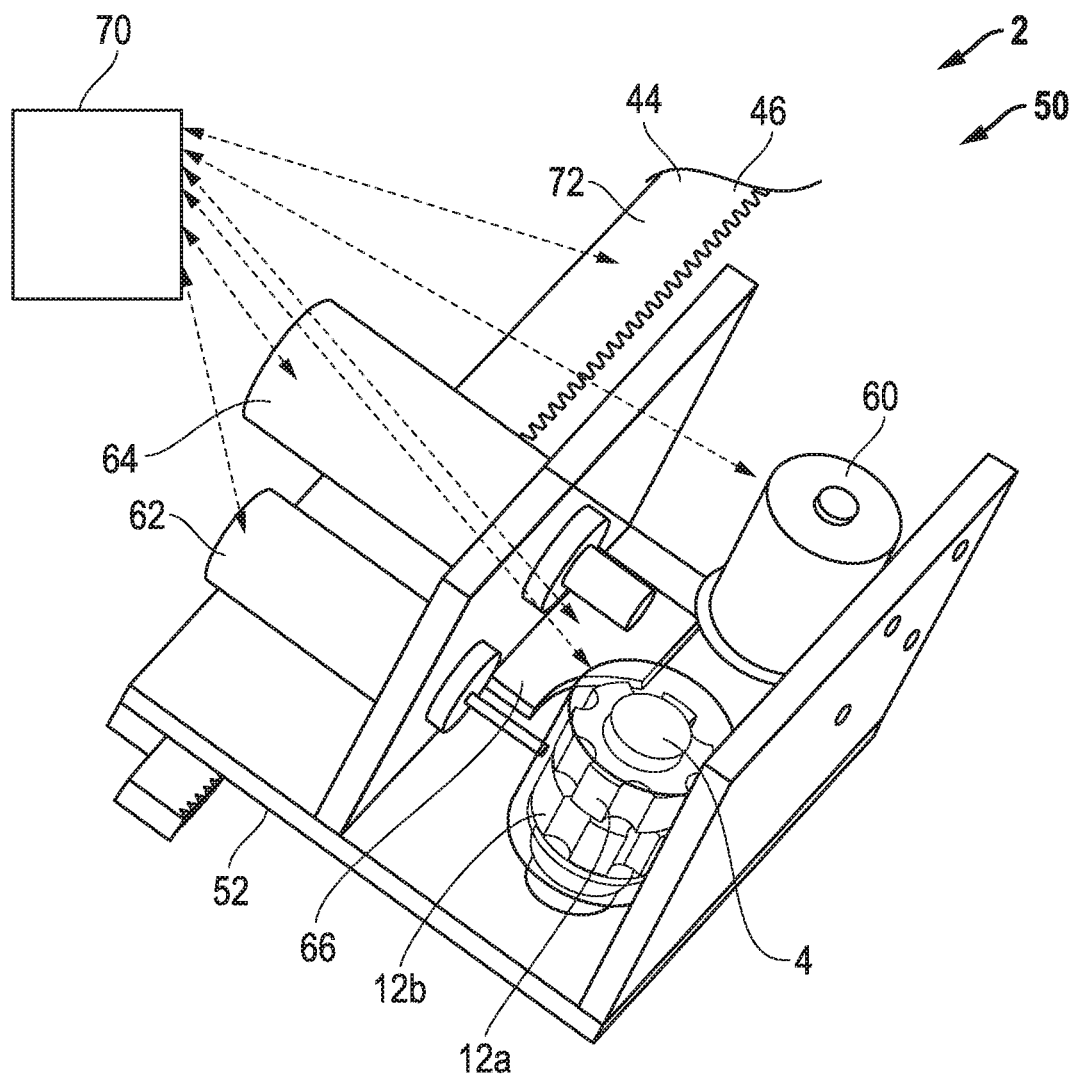
FIG. 5B is a perspective view of a friction brake and/or gearbox according to at least one embodiment of the invention.

In at least one embodiment, as best illustrated in FIGS. 5A-5B, the friction brake 2 or vehicle door panel assembly may further include a gearbox 50. In at least one embodiment, the gearbox 50 may include a gearbox housing 52. In at least one embodiment, the gearbox housing 52 may incorporate or at least partially surround the housing 10. In at least one embodiment, the gearbox 50 may include a brake unit gear 54. In at least one embodiment, the gearbox 50 may include a motor gear 56. In at least one embodiment, the gearbox 50 can include a motor gear unit 60 operatively connected to the motor gear 56. In at least one embodiment, the gearbox 50 can include a soft stop solenoid 62. In at least one embodiment, the gearbox 50 can include a release solenoid 64. In at least one embodiment, the gearbox 50 can include a stop plate 66. In at least one embodiment, the soft stop solenoid 62 may be operatively connected to at least one of the motor gear 56, the pinion gear 42 or the brake unit gear 54. In at least one embodiment, the release solenoid 64 may be operatively connected to at least one of the motor gear 56, the pinion gear 42 or the brake unit gear 54.

In at least one embodiment, the friction brake 2 or vehicle door panel assembly can operate in "operation mode" where it can be used to operate, actuate, or move the movable body. In at least one embodiment in this mode, the rotation of the shaft 4 can engage the gearset 40 to engage the pinion gear 42 to engage the engagement means 46 of the checker arm or rack 44 to move the checker arm or rack 44 and move the movable body as a result. In this first embodiment, the motor gear unit 60 may rotate the shaft 4 resulting in the rotation of the gearset 40, pinion gear 42 and engagement of the checker arm 44 to move the movable body. In this embodiment, the at least one locking component 30 may not be engaged so the shaft 4 can rotate with minimal torque, In at least one embodiment, the friction brake 2 or vehicle door panel assembly can operate in "holding mode" where the soft stop solenoid 62 can engage the first component 30a to engage the first lock collar 12a to engage the first tolerance ring 20a to slowly lock the shaft 4 to bring the checker arm 44 to a controlled stop via engagement of the brake unit gear 54 or motor gear 56 to stop the rotation of the pinion gear 42. In a number of embodiments, in holding mode, the first tolerance ring 20a or first lock collar 12a may hold the friction brake 2 until the motor can be activated again such as holding the movable body or door on an incline until the motor gear unit 60 operates the friction brake 2 or vehicle door panel assembly again. In this mode, a user may open, close or move the movable body or vehicle door through movement of the body itself which may be allowed to move the checker arm 44 which will rotate the pinion gear 42 which will rotate the shaft 4 through the first tolerance ring 20a. In this mode, the tolerance ring 20a may rotate or move while the lock collar 12a will not rotate. In this way, the tolerance ring 20a may be adapted to provide rotation of the shaft 4 when the lock collar 12a may be prevented from rotating. In at least one embodiment, the first tolerance ring 20a serves as overload protection in case the movable body may be forced to move, preserving the components of the friction brake 2 and/or gearbox 50. In at least one embodiment, the friction brake 2 or vehicle door panel assembly can operate in "emergency mode" to bring the gearbox 50, and the checker arm 44 to a hard stop. In at least one embodiment, in "emergency mode," where the soft stop solenoid 62 can engage the second locking component 30b to engage the second lock collar 12b to engage the second tolerance ring 20a to immediately lock the shaft 4 to bring the checker arm 44 to an emergency stop via engagement of the brake unit gear 54 or motor gear 56 to stop the rotation of the pinion gear 42 with haste. In this mode, the tolerance ring 20b may rotate or move while the lock collar 12a will not rotate. In this way, the tolerance ring 20b may be adapted to provide rotation of the shaft 4 when the lock collar 12b may be prevented from rotating. In at least one embodiment in "emergency mode," power may be lost to the release solenoid 64 which may release the stop plate 66 to engage the second locking component 30b to engage the second lock collar 12b to engage the second tolerance ring 20a to immediately lock the shaft 4 to bring the checker arm 44 to an emergency stop via engagement of the brake unit gear 54 or motor gear 56 to stop the rotation of the pinion gear 42. In this mode, the movable body may be stopped instantly by cutting the power to the release solenoid 64 or the stop solenoid 62. In at least one embodiment, the use of a tolerance ring 20 in the friction brake 2 or vehicle door panel assembly can result in a stopping force not being dependent on the strength of the stop solenoid 62, release solenoid 64, or motor gear unit 60. In this case, a larger load may be braked by a small actuation force by use of the tolerance ring in the friction brake 2 or vehicle door panel assembly.

In at least one embodiment, as shown in FIG. 5B, the friction brake 2 or vehicle door panel assembly can further include an electronic control unit ("ECU") 70. In at least one embodiment, the ECU 70 can be operatively connected to at least one of the motor gear unit 60, the release solenoid 64 or the soft stop solenoid 62. In at least one embodiment, the ECU 70 can send a signal to at least one of the motor gear unit 60, the release solenoid 64 or the soft stop solenoid 62 to stop, start or continue operation of the friction brake 2 or vehicle door assembly based on the modes described above. In at least one embodiment, the ECU 70 may send an actuation signal to at least one of the motor gear unit 60, the release solenoid 64 or the soft stop solenoid 62 to stop, start or continue operation of the friction brake 2 or vehicle door assembly based on the modes described above. In at least one embodiment, the ECU 70 may send an actuation signal to the locking component 30 to stop, start or continue operation of the friction brake 2 or vehicle door assembly based on the modes described above. In at least one embodiment, the actuation signal may be a by magnetic, electric, or electromagnetic means. In at least one embodiment, the friction brake 2 or vehicle door panel assembly can further include sensor 72. In at least one embodiment, the sensor 72 may sense a condition in or around the movable body that warrants actuation of the friction brake 2 or vehicle door panel assembly to actuate the movable body. In at least one embodiment, the sensor may locate a condition such as an impediment or object that will strike the movable body in its current location and cause damage to the movable body. In this case, the sensor 72 may send a signal to the ECU 70 which may send a signal to the friction brake 2, gearset 50 or vehicle door panel assembly to operate to move the movable body so it will not strike the impediment and cause damage.

In at least one embodiment, the ECU 70 controls ON and OFF of the actuation signal being applied to at least one of the motor gear unit 60, the release solenoid 64 or the soft stop solenoid 62. The ECU 70 may be interlocked with a sensor 72 for detecting an object around a door, and thus, when an object is detected near the door, the movement of the door may be restricted by applying an actuation signal to at least one of the motor gear unit 60, the release solenoid 64 or the soft stop solenoid 62. Accordingly, the ECU may prevent the opening or closing of the door and may fix the position of the door.

In at least one embodiment, the friction brake 2 or vehicle door panel assembly has a checker arm 44 attached to a vehicle body which acts as a hinge so that the checker arm 44 rotates, and that may be located between the door and the vehicle body, and a door checker that may be attached to the door to maintain the door in a stop-state at a position of a moving path of the door while sliding along a length direction of the checker arm 44 by accommodating the checker arm 44 therein.

In at least one embodiment, the friction brake 2 or vehicle door panel assembly may include a lubricant on any of its components. In at least one embodiment, the lubricant may include a grease including at least one of lithium soap, lithium disulfide, graphite, mineral or vegetable oil, silicone grease, fluorether-based grease, apiezon, food-grade grease, petrochemical grease, or may be a different type. In at least one embodiment, the lubricant may include an oil including at least one of a Group I-Group III+ oil, paraffinic oil, naphthenic oil, aromatic oil, biolubricant, castor oil, canola oil, palm oil, sunflower seed oil, rapeseed oil, tall oil, lanolin, synthetic oil, polyalpha-olefin, synthetic ester, polyalkylene glycol, phosphate ester, alkylated naphthalene, silicate ester, ionic fluid, multiply alkylated cyclopentane, petrochemical based oil, or may be a different type. In at least one embodiment, the lubricant may include a solid based lubricant including at least one of lithium soap, graphite, boron nitride, molybdenum disulfide, tungsten disulfide, polytetrafluoroethylene, a metal, a metal alloy, or may be a different type.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A friction brake comprising: a shaft having an input end and an output end; at least one lock collar; at least one tolerance ring disposed between the lock collar and the shaft providing an interference fit therebetween; and a locking component adapted to engage the lock collar to prevent rotation of the lock collar.

Embodiment 2

A vehicle door panel assembly comprising: a friction brake comprising: a shaft having an input end and an output end; at least one lock collar; at least one tolerance ring disposed between the lock collar and the shaft providing an interference fit therebetween; and a locking component adapted to engage the lock collar to prevent rotation of the lock collar, wherein the shaft output end is operatively connected to a door panel.

Embodiment 3

A method comprising: providing a friction brake comprising: a shaft having an input end and an output end; at least one lock collar; at least one tolerance ring disposed between the lock collar and the shaft providing an interference fit therebetween; and a locking component adapted to engage the lock collar to prevent rotation of the lock collar; and engaging the locking component to prevent rotation of the lock collar.

Embodiment 4

The friction brake, vehicle door panel assembly, or method of any one of the preceding embodiments, wherein the tolerance ring is adapted to provide rotation of the shaft when the lock collar is prevented from rotating.

Embodiment 5

The friction brake, vehicle door panel assembly, or method of any one of the preceding embodiments, wherein the locking mechanism comprises locking pins.

Embodiment 6

The friction brake, vehicle door panel assembly, or method of any one of the preceding embodiments, wherein the locking component engages the lock collar based on an actuation signal provided by magnetic, electric, or electromagnetic means.

Embodiment 7

The friction brake, vehicle door panel assembly, or method of any one of the preceding embodiments, wherein the at least one tolerance ring has a diameter of no greater than about 5 mm, of no greater than about 10 mm, of no greater than about 15 mm, of no greater than about 20 mm.

Embodiment 8

The friction brake, vehicle door panel assembly, or method of any one of the preceding embodiments, wherein the at least one tolerance ring has a length of no greater than about 5 mm, of no greater than about 10 mm, of no greater than about 15 mm, of no greater than about 20 mm.

Embodiment 9

The friction brake, vehicle door panel assembly, or method of any one of the preceding embodiments, wherein the at least one tolerance ring has a holding torque of about $1 \leq X \leq$ about 7 N·m.

Embodiment 10

The friction brake, vehicle door panel assembly, or method of any one of the preceding embodiments, wherein the at least one tolerance ring comprises an annular band and a plurality of projections around the circumference of the annular band.

Embodiment 11

The friction brake, vehicle door panel assembly, or method of any one of the preceding embodiments, wherein the shaft input end is operatively connected to a motor.

Embodiment 12

The friction brake, vehicle door panel assembly, or method of any one of the preceding embodiments, wherein the friction brake further comprises at least one washer.

Embodiment 13

The friction brake, vehicle door panel assembly, or method of any one of the preceding embodiments, wherein the fixing assembly further comprises a bearing.

Embodiment 14

The friction brake, vehicle door panel assembly, or method of any one of the preceding embodiments, wherein the fixing assembly further comprises a housing at least partially surrounding the lock collar.

Embodiment 15

The friction brake, vehicle door panel assembly, or method of any one of the preceding embodiments, wherein the fixing assembly further comprises a circlip.

Embodiment 16

The friction brake, vehicle door panel assembly, or method of any one of the preceding embodiments, wherein the locking component further comprises a locking pin assembly.

Embodiment 17

The friction brake, vehicle door panel assembly, or method of any one of the preceding embodiments, wherein the friction brake further comprises a solenoid adapted to provide an actuation signal to the locking component.

Embodiment 18

The friction brake, vehicle door panel assembly, or method of any one of the preceding embodiments, wherein the at least one tolerance ring comprises a first tolerance ring and a second tolerance ring.

Embodiment 19

The friction brake, vehicle door panel assembly, or method of embodiment 18, wherein the first tolerance ring has a holding torque of about 1 N·m to about 3 N·m and the second tolerance ring has a holding torque of about 5 N·m to about 20 N·m and wherein the first tolerance ring and the second tolerance ring have different holding torques.

Embodiment 20

The friction brake or method of any one of the preceding embodiments, wherein shaft output end is operatively connected to a checker arm.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A friction brake comprising:
   a shaft having an input end and an output end;
   at least one lock collar comprising a first piece and a second piece;
   a plurality of tolerance rings, a first tolerance ring disposed between the first piece of the lock collar and the shaft providing an interference fit therebetween, and a second tolerance ring disposed between the second piece of the lock collar and the shaft providing an interference fit therebetween, wherein at least one of the tolerance rings comprises an annular band and a plurality of deformable projections around the circumference of the annular band; and
   a locking component adapted to engage the lock collar to prevent rotation of the lock collar.

2. The friction brake of claim 1, wherein the tolerance ring is adapted to provide rotation of the shaft when the lock collar is prevented from rotating.

3. The friction brake of claim 1, wherein the locking component comprises locking pins.

4. The friction brake of claim 1, wherein the locking component engages the lock collar based on an actuation signal provided by magnetic, electric, or electromagnetic means.

5. The friction brake of claim 1, wherein the at least one tolerance ring has a diameter of no greater than about 20 mm.

6. The friction brake of claim 1, wherein the at least one tolerance ring has a length of no greater than about 20 mm.

7. The friction brake of claim 1, wherein the at least one tolerance ring has a holding torque of about $1 \leq X \leq$ about 7 N·m.

8. The friction brake of claim 1, wherein the friction brake further comprises at least one washer.

9. The friction brake of claim 1, wherein the friction brake further comprises a bearing.

10. The friction brake of claim 1, wherein the friction brake further comprises a housing at least partially surrounding the lock collar.

11. The friction brake of claim 1, wherein the friction brake further comprises a circlip.

12. The friction brake of claim 1, wherein the friction brake further comprises a solenoid adapted to provide an actuation signal to the locking component.

13. The friction brake of claim 1, wherein the at least one tolerance ring comprises a first tolerance ring and a second tolerance ring.

14. A vehicle door panel assembly comprising:
a friction brake comprising:
a shaft having an input end and an output end;
at least one lock collar;
at least one tolerance ring disposed between the lock collar and the shaft providing an interference fit therebetween; and
a locking component adapted to engage the lock collar to prevent rotation of the lock collar, wherein the shaft output end is operatively connected to a door panel.

15. The vehicle door panel assembly of claim 14, wherein the first tolerance ring has a holding torque of about 1 N·m to about 3 N·m and the second tolerance ring has a holding torque of about 5 N·m to about 20 N·m and wherein the first tolerance ring and the second tolerance ring have different holding torques.

16. The vehicle door panel assembly of claim 14, wherein the shaft input end is operatively connected to a motor.

17. The vehicle door panel assembly of claim 14, wherein shaft output end is operatively connected to a checker arm.

18. A method comprising:
providing a friction brake comprising:
a shaft having an input end and an output end;
at least one lock collar comprising a first piece and a second piece;
a plurality of tolerance rings, a first tolerance ring disposed between the first piece of the lock collar the shaft providing an interference fit therebetween, and a second tolerance ring disposed between the second piece of the lock collar and the shaft providing an interference fit therebetween, wherein the at least one of the tolerance rings comprises an annular band and a plurality of deformable projections around the circumference of the annular band; and
a locking component adapted to engage the lock collar to prevent rotation of the lock collar; and
engaging the locking component to prevent rotation of the lock collar.

* * * * *